Patented Jan. 4, 1944

2,338,416

UNITED STATES PATENT OFFICE 2,338,416

FILM-FORMING COMPOSITION

Haliburton Fales, Nassau, Bahamas

No Drawing. Application December 6, 1940,
Serial No. 368,799

6 Claims. (Cl. 167—58)

My invention is a new composition of matter primarily designed for use as an aqueous ambulatory dressing or skin lotion for preventing skin-burn from the rays of the sun, ultra-violet lights, or other causes; and for alleviating pain caused by inflammation, blistering, or other injuries of the skin resulting from burns, poisons or wounds and for promoting the healing of such injuries.

My new composition provides a demulcent, non-greasy, non-tacky, non-irritating and non-poisonous aqueous fluid, which when applied to the skin rapidly dries to a tenacious, cohesive, tough and absorbent pellicle or film which, while scarcely visible, forms an effective filter for ultra-violet or burning rays; which is substantially impervious to air; which will not crack, peel, or rub off; which is smooth, pleasant, non-greasy, non-sticky to the touch, and which is readily removable by water-washing.

This phase of my invention is predicated primarily upon my discovery that aloin may be combined in aqueous solution with water-soluble pelliculizing substances, such as gums or colloids, to produce a clear solution, which, when applied to the skin or other surface and permitted to dry by evaporation forms a very thin coating or pellicle having the attributes above set forth.

The resistance of such coating or film to the transmission of ultra-violet or burning rays of light from the sun or other source is many times greater than the resistance thereto of aloin or tinctures thereof or of the gums or colloids alone, and this resistivity appears to be a primary factor in the prevention or minimizing of skin burning or blistering from long exposure to sunlight or ultra-violet ray lamps.

The imperviousness to air of the coating or pellicle and the tendency of such pellicle to absorb serous fluids appear to be primary factors in the alleviation of pain when my compound is applied to skin which has been burned, inflamed or blistered by the sun or otherwise.

But in addition to providing protection from light and air, and directly absorbing serous fluids, my film-forming aqueous solute containing aloin may be used as an effective vehicle for mild, hypertonic, water-soluble medicaments, antiseptics, and hydroscopic substances.

The inclusion of a compatible, non-styptic, weak acid, and particularly a mildly acid antiseptic, causes the composition to act as a styptic, as I have found that aloin and weak acid combine to form an effective liquid styptic.

The inclusion of such ingredients, or some of them, permits the formation of a greaseless film which maintains desired medicaments in contact with wounded surfaces and prevents septicemia while excluding air and filtering light from such surfaces, absorbing serous fluids, and minimizing hemorrhage. The styptic and osmotic actions of the dressing, accompanied by evaporation, produce an exceptionally dry wound—a condition unfavorable to all forms of bacterial growth.

The hypertonicity of compounds above described permits the gradual introduction of antiseptics into and withdrawal of toxic serum from an injured skin, particularly when productive of considerable osmotic pressure and the gum used is a good absorbent and has a large capacity for the storage of liquid. The styptic effect of a compound of aloin and a mild acid is particularly useful in conjunction with the sealing effect of the aloin-gum compound, but an aqueous solution of aloin and a water-soluble antiseptic acid may be usefully employed as a styptic without the inclusion of gum or other film forming constituents.

These features of my invention are based primarily upon my discoveries that a film formed from an aqueous solute containing aloin while quite hygroscopic in itself, can hold considerable additional amounts of liquid withdrawn by osmotic action from the tissues when the action of the film per se is augmented by the inclusion of other hygroscopic ingredients, and that aloin and weak acids combine to form a styptic compound.

Agar is an example of a gum which I have found satisfactorily combines with aloin in aqueous solution to form a greaseless, light screening, air impervious pellicle from an aqueous composition. Benzoic acid and glycerine are examples of medicinal, antiseptic and hygroscopic substances which may be used to increase the medicinal, antiseptic, and hydroscopic properties of the compound, if desired. Glycerine very greatly lengthens the period of actual or potential osmotic activity, but tends to decrease the light screening effect of the film; hence the amount thereof used should be limited.

In making my composition from my preferred ingredients, the agar is preferably dissolved in boiling water and the aloin, benzoic acid and glycerine added thereto. The proportions by weight of the ingredients, per gallon of total water, is preferably approximately as follows:

| | Ounces |
|---|---|
| Aloin | ½ to 4 |
| Agar | ½ to 1 |
| Benzoic acid | ⅛ to ½ |
| Glycerine | 1 to 5 |

A composition of desirable viscosity and strength for ordinary use may be produced by using 1 ounce of aloin, 300 grains of agar, 100 grains of benzoic acid and 5 ounces of glycerine per gallon of water. The glycerine and benzoic acid may be omitted without changing the proportions of the other ingredients used, and the viscosity resulting from the inclusion of a given quantity of agar may be varied by varying the duration of the heating thereof at say 180° F. or of boiling at atmospheric pressure or under pressure up to say 30 pounds.

The aloin used in making my composition is preferably in the form of a lemon-yellow to dark yellow or light brown crystalline powder but it may be extracted directly from aloes or aloe leaves by boiling them in water; the quantity of leaves required being dependent on the species of aloe. The aloin content of aloes varies from about 4.5% to 25%. The aqueous extract should have an aloin content of the order above indicated.

In lieu of or in combination with agar, I may use many other gums or colloids which form, with aloin, pellicles of the type above described. Such substances, including agar, are herein designated pelliculizing substances. Among the pelliculizing substances I have found most advantageous are gum tragacanth, sodium alginate and quince seed extract, which form no precipitate on standing and need be used in but slightly greater proportions than agar. Pectin and flaxseed extract may also be used without danger of precipitation but in somewhat larger proportions, viz., from nearly 2 to 4 times as much as of agar. Carob seed gum, locust kernel gum, Irish moss, Iceland moss, India gum, althea gum, acacia (gum arabic) and mesquite gum also form with aloin satisfactory light and air screening films but are less desirable because of their tendency to flocculate or precipitate or the larger quantity thereof required. Even gelatine and starch may be employed though they are less desirable because of the slight tackiness of the former and the flakiness of the latter, which may, however, be largely overcome by the use therewith of glycerine.

In lieu of or in addition to benzoic acid there may be used other mild, water-soluble antiseptics which will not precipitate the aloin or the pelliculizing agent, such for instance as salicylic acid up to 250 grains per gallon of water, benzoate of soda up to say 130 grains per gallon, or thymol up to say 80 grains per gallon, or menthol up to say 120 grains per gallon, or chlorobutanol up to say 240 grains per gallon; or, where color is not important, flavine or acriflavine up to say 60 grains per gallon.

To form a staple liquid styptic, an aqueous solution may be made from say 1 ounce of aloin and approximately one-fifth ounce of benzoic acid, salicylic acid or other mild antiseptic acid per gallon of water.

Glycerine is much preferred as a hygroscopic ingredient because it also acts as a plasticizer and emollient, but under certain conditions magnesium sulphate, sodium chloride or other non-alkaline hygroscopic material of high molecular weight may be added or substituted therefor.

The product resulting from the preferred formula above given is initially a light yellow or clear honey color and good viscosity. On standing in contact with air, it darkens to a clear coffee color but without any perceptible change in its viscosity or light-filtering or air-excluding characteristics.

While my composition is primarily designed for pharmaceutical use, it may also be used in photographic or other optical work to prevent or limit the passage of light through glass or other transparent medium on which it forms a film. For such use the antiseptic and hygroscopic materials are preferably omitted, or light transmission may be varied or regulated by the addition of glycerine to the aqueous solution of aloin and gum.

Having described my invention, I claim:

1. A film-forming composition of matter comprising an aqueous vehicle containing per gallon of water approximately—

|  | Ounces |
|---|---|
| Aloin | ½ to 4 |
| Agar | ½ to 1 |
| Glycerine | 1 to 5 |

2. A film-forming composition of matter comprising an aqueous vehicle containing per gallon of water approximately one-half to four ounces of aloin and at least one-half ounce of water-soluble pelliculizing gum, said gum and at least a portion of said aloin being dissolved in said water.

3. A film-forming composition of matter comprising an aqueous vehicle containing per gallon of water approximately one-half to four ounces of aloin, from one to five ounces of glycerine and at least one-half ounce of a water soluble pelliculizing gum, said gum and at least a portion of said aloin being dissolved in said water.

4. A film-forming composition of matter comprising an aqueous vehicle containing per gallon of water approximately one-half to four ounces of aloin and at least one-half ounce agar, said agar and at least a portion of said aloin being dissolved in said water.

5. A film-forming composition of matter comprising an aqueous vehicle containing per gallon of water approximately one-half to four ounces of aloin and at least slightly in excess of one-half ounce of sodium alginate, said sodium alginate and at least a portion of said aloin being dissolved in said water.

6. A film-forming composition of matter comprising an aqueous vehicle containing per gallon of water approximately one-half to four ounces of aloin and at least slightly in excess of one-half ounce of gum tragacanth, said gum tragacanth and at least a portion of said aloin being dissolved in said water.

HALIBURTON FALES.